United States Patent [19]

Kahovec

[11] 4,343,920
[45] Aug. 10, 1982

[54] POLYMERIC POLYDENTATE COMPLEXONS AND A METHOD FOR THEIR PREPARATION

[75] Inventor: Jaroslav Kahovec, Prague, Czechoslovakia

[73] Assignee: Cexkoslovenska akademie ved, Prague, Czechoslovakia

[21] Appl. No.: 218,125

[22] Filed: Dec. 19, 1980

[30] Foreign Application Priority Data

Dec. 22, 1979 [CS] Czechoslovakia ............ 9318-79

[51] Int. Cl.³ .............................................. C08F 8/30
[52] U.S. Cl. .................................. 525/328.2; 525/375; 525/382; 536/56; 536/61; 536/102; 536/106; 525/330.5; 525/328.5
[58] Field of Search ............... 525/375, 374, 382; 536/56, 61, 102, 106

[56] References Cited

U.S. PATENT DOCUMENTS

| | | | |
|---|---|---|---|
| T896,055 | 3/1972 | Long et al. .................. | 525/375 |
| 3,471,460 | 10/1969 | Rees ........................... | 525/382 |
| 3,519,610 | 7/1970 | Huntzinger ................... | 525/382 |
| 3,884,846 | 5/1975 | Otsuki et al. ................ | 525/382 |
| 3,896,092 | 7/1975 | Epton et al. ................. | 525/375 |

OTHER PUBLICATIONS

Analytical Chemistry, vol. 49, #3, (Mar. 1977), Moyers et al., pp. 418–423.

*Primary Examiner*—William F. Hamrock

[57] ABSTRACT

The invention pertains to polymeric polydentate complexons (i.e. chelating agents) of general formulae I and II

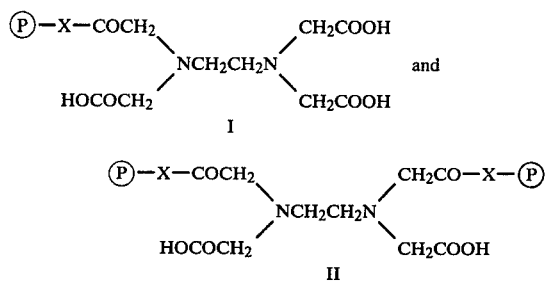

where (P) is a linear or three-dimensional polymeric skeleton and X is —O— or

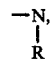

while R is H, $C_1$–$C_6$ alkyl, or phenyl or phenyl substituted with 1-2 $C_1$–$C_6$ alkyl or alkoxy groups. Another objective of the invention is a method for producing the polymeric polydentate complexons described above, wherein a compound (P)-XH, where (P) and X have the above given meaning, reacts with 4,4'-ethylenebis(2,6-morpholinedione) the presence of an inert solvent and, if it is desired, also in the presence of acidic or basic catalysts, e.g. protic acids, Lewis acids, tertiary amines, and alkaline or alkaline earth salts of carboxylic acids.

2 Claims, No Drawings

POLYMERIC POLYDENTATE COMPLEXONS AND A METHOD FOR THEIR PREPARATION

The invention relates to polymeric polydentate complexons and a method for their preparation.

Remarkable properties of complexons are well known and their introduction to analytical chemistry meant a revolution in the titrimetric determination of metals. Application of an insoluble crosslinked polymeric complexon, i.e. of a polymeric skeleton with chemically bound complexon grouping, is connected with some advantages and effects already known from other cases of active functional groups transferred from a low-molecular weight compound to a three-dimensional polymer. The most important advantage is the possible use of a continuous column arrangement. Finally, the preparation of several types of polymeric complexons was the result of above considerations.

The most common three-dimensional polymer with a complexon grouping of iminodiacetic acid has the structure

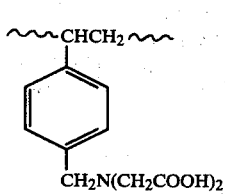

This polymeric complexon and the related types and their applications are discussed in numerous literature items and also in a monograph. This polymer is commercially available under various trade names, e.g. Dowex A-1 (Dow Chemical Co., USA), Chelex-100 (Bio-Rad Laboratories, USA), Lewatit TP 207 (Farbenfabrik Bayer, FRG), Wofatit CM-50 (Chemiekombinat Bitterfeld, GDR).

The complexon grouping of iminodiacetic acid was introduced also to other carriers, as cellulose and other polysaccharides, poly(2,3-epoxypropyl methacrylate), poly(vinylamine), etc.

The attempts to prepare a polymeric complexon with a sexadentate uniform and completely functional complexon grouping of ethylenediaminotetraacetic acid (EDTA) or its analogues were as far only sporadic and not very satisfactory.

Literature describes the preparation of a complexon resin by polycondensation of 1,3-phenylenediamine-N,N,N',N'-tetraacetic acid and resorcinol with formaldehyde.

An example of other polymeric complexon is the compound

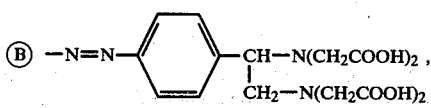

where ⒷⒷ is a protein formed by coupling of the corresponding diazonium salt with proteins. A chelate of this compound with a radioactive metal serves in labeling of proteins. However, the preparation of aniline derivative with the complexon grouping is difficult; it comprises six synthetic steps and the overall yield is rather low.

The preparation of a three-dimensional polymeric complexon was recently described which consisted in the following reactions:

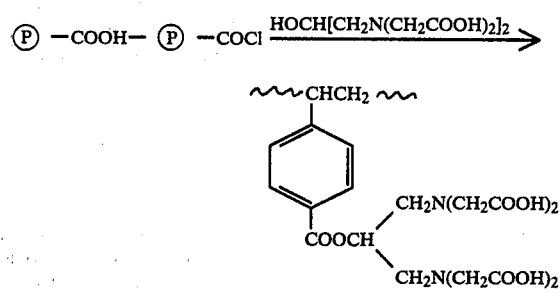

Lately there were described two styrene-divinylbenzene copolymers with the EDTA grouping

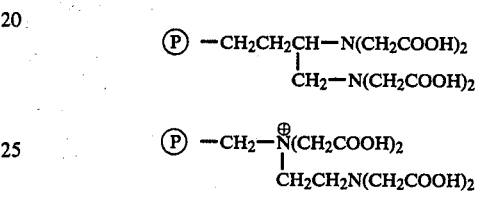

However the preparation of both polymers requires heating to temperature 115°–130° C. for 8–13 days to realize the bonding of the complexon grouping to skeleton.

As expected, polymeric complexons with the sexadentate grouping exhibit a higher stability of metal chelates than the tridentate polymeric complexon based on iminodiacetic acid. In addition to this, they chelate metals already at lower pH values.

But the preparation of polymeric sexadentate complexons by methods hitherto known has several disadvantages. The syntheses comprise several steps and gave low conversions; reactions insuitable for large-scale syntheses were used (e.g. Grignard reaction) or low-reactive derivatives of low-molecular weight complexons were employed which required special reaction conditions to be applied, as e.g. long reaction periods, special solvents, or high temperature.

An objective of this invention are polymeric polydentate complexons of general formulae I and II,

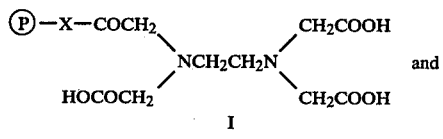

and

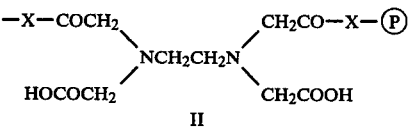

where Ⓟ is the linear or three-dimensional polymeric skeleton and X is —O— or

where R is hydrogen, alkyl with 1-6 carbon atoms, phenyl or phenyl substituted with 1-2 alkyl or alkoxyl groups with 1-6 carbon atoms.

The preparation of the polymeric complexons of general formulae I and II, according to the invention, is based on a method wherein the polymeric compound  -XH, where  is a polymeric skeleton and X is —O— or $$-\underset{R}{N}-,$$

while R is H, alkyl with 1-6 carbon atoms, phenyl or phenyl substituted with 1-2 alkyl or alkoxyl groups with 1-6 carbon atoms, reacts with 4,4'-ethylenebis(2,6-morpholinedione) in the presence of an inert solvent. The reaction can be sped up or the yields can be enhanced by using acidic or basic catalysts. Only such solvents or reaction media can be employed which do not react with acid anhydrides. The suitable inert solvents are e.g. benzene, chlorobenzene, ethers, acetone, pyridine, dimethylformamide, dimethylacetamide, and N-methylpyrrolidinone. As acidic catalyst it can be used, for example, sulphuric acid, perchloric acid, hydrogen chloride, and zinc chloride; as basic catalysts e.g. sodium acetate or tertiary amines, as pyridine, triethylamine, dimethylaniline, N-methylmorpholine.

The reaction is carried out at temperatures from 20° C. as high as to the boiling temperature of the corresponding reaction medium; it is advantageous to work in the temperature region 50°-100° C. The reaction proceeds smoothly, no side products are formed, and the yields are high.

4,4'-Ethylenebis(2,6-morpholinedione)—i.e. bisanhydride of ethylenediaminotetraacetic acid—may be easily prepared from the industrially produced ethylenediaminetetraacetic acid.

The starting polymers  -XH employed may be both natural and synthetic polymers carrying hydroxyl groups or primary or secondary amino groups, e.g. starch, cellulose, chitosan, poylethyleneimine, and poly(vinylamine). Also crosslinked polymers can be used, as poly[2-hydroxyethyl methacrylate-co-ethylene dimethacrylate], poly[2,3-dihydroxyethyl methacrylate-co-ethylene]dimethacrylate, poly[vinylbenzylamine-co-divinylbenzene], either in the form of gels or in a macrophorous form.

The resulting polymeric complexons are stable in water, in neutral, weakly alkaline and strongly acidic solutions. They absorb metallic ions from aqueous solutions in the amount as high as 1.5-2 mmol/g of polymer.

The complexon polymers are suitable for recovery of heavy metals from electroplating bath, removal of heavy metals from waste waters, concentrating and separation of heavy metals in hydrometallurgy, and separation of metals in analytical chemistry.

The following examples of performance illustrate the invention without limiting its scope by any means.

EXAMPLE 1

The mixture of 29 g of dry bead cellulose, 300-500 g of anhydrous pyridine and 126 g of 4,4'-ethylenebis(2,6-morpholinedione) was heated to 75° C. for 12 hours. After filtration, washing with aqueous solution of sodium hydrogen carbonate, water and methanol, and drying, it was obtained 44 g of the product. The characteristics of product: nitrogen content 2.70%, i.e. 0.96 mmol of bound EDTA/g; infrared spectra showed the presence of ester and carboxylate groups; sorption of copper: 0.82 mmol Cu++/g.

EXAMPLE 2

The mixture consistiong of 32 g of dry poly[2-hydroxyethyl methacrylate-co-ethylene dimethacrylate], manufactured by suspension copolymerization of 76% of 2-hydroxyethyl methacrylate and 24% of ethylene dimethacrylate in the presence of n-dodecanol and cyclohexanol (Spheron P 1000, molecular-weight exclusion limit 800,000-5,000,000; the product of Lachema, Brno), 300 cm$^3$ of anhydrous pyridine and 95 g of 4,4'-ethylenebis(2,6-morpholinedione) was processed in the same way as described in Example 1. Characteristics of the product: content of nitrogen 4.52%, i.e. 1.61 mmol of bound EDTA per g of polymer; infrared spectra showed the presence of ester and carboxylate groups; sorption of copper 1.19 mmol Cu++/g.

EXAMPLE 3

The same copolymer which was produced in the way described in Example 2 (Spheron P 100,00, molecular-weight exclusion limit about 10$^8$, the product of Lachema, Brno) was used in the procedure described in Example 2 and the product was obtained which contained 2.98% of nitrogen, i.e. 1.06 mmol of bound EDTA per g of polymer. The sorption of copper: 0.90 mmol Cu++/g.

EXAMPLE 4

Wet bead 4-aminophenylsulphonylethyl cellulose containing 0.88% of nitrogen was, in the amount of 70 g, stirred with 300 cm$^3$ of acetone and then with 300 cm$^3$ of pyridine. The cellulose derivative was filtered by suction, then suspended in 1700 cm$^3$ of chlorobenzene, 226 g of 4,4'-ethylenebis(2,6-morpholinedione) was added, and the mixture was heated to 75° C. for 24 hours. The product was isolated by filtration, successively washed with diluted aqueous ammonia, water and methanol. Characteristics of the product: content of nitrogen 2.69%, i.e. 0.64 mmol of bound EDTA per g of polymer; infrared spectra proved the presence of amide and carboxylate groups. The sorption of copper: 0.55 mmol Cu++/g.

EXAMPLE 5

The mixture containing 13.8 g of the 4-aminophenylsulphonylethyl derivative of the copolymer mentioned in Example 2 (Spheron ArA 1000, content of nitrogen 0.61%, the product of Lachema, Brno), 100 cm$^3$ of anhydrous pyridine and 5.1 g of 4,4'-ethylenebis(2,6-morpholinedione) was heated to 70° C. for 26 hours. On successive washing with water, aqueous pyridine and hot water, 18.7 g of the product was obtained which contained 2.85% of nitrogen. The sorption of copper: 0.40 mmol Cu++/g.

EXAMPLE 6

A macroporous copolymer of 2-methylaminoethyl methacrylate with ethylene dimethacrylate, which contained 2.2% of nitrogen and was prepared by suspension copolymerization of 2-(4-toluenesulphonyloxy)ethyl methacrylate with ethylene dimethacrylate in the presence of toluene followed by amination with aqueous methylamine, was, in the amount of 5 g, subjected to the reaction with 4.1 g of 4,4'-ethylenebis(2,6-morpholinedione) under the same conditions as in Example 5. The resulting product contained 3.1% of nitrogen. The sorption of copper: 0.61 mmol Cu++/g.

EXAMPLE 7

A macroporous copolymer of 2-butylaminoethyl methacrylate with ethylene dimethacrylate, which contained 1.9% of nitrogen and was produced by suspension copolymerization of 2-(4-toluenesulphonyloxy)ethyl methacrylate with ethylene dimethacrylate followed by amination with butylamine, was, in the amount of 5 g, subjected to the reaction with 3.5 g of 4,4'-ethylenebis(2,6-morpholinedione) under the same conditions as in Example 5. The product was obtained which contained 2.9% of nitrogen. The sorption of copper: 0.50 mmol Cu++/g.

EXAMPLE 8

The mixture of 1 g of dry bead cellulose, 6 g of 4,4'-ethylenebis(2,6-morpholinedione) and 50 cm³ of dioxan saturated with hydrogen chloride was heated to 50° C. for 10 hours. On washing with water and aqueous pyridine, the product was obtained which contained 3.1% of nitrogen, i.e. 1.11 mmol of bound EDTA per g of polymer. Infrared spectra showed the presence of ester and carboxylate groups. The sorption of copper: 0.95 mmol Cu++/g.

EXAMPLE 9

The mixture of 1 g of dry bead cellulose, 6 g of 4,4'-ethylenebis(2,6-morpholinedione), 5 cm³ of triethylamine and 50 cm³ of chlorobenzene was refluxed for 12 hours. On washing with water and solution of sodium hydrogen carbonate, the product was obtained which contained 2.50% of nitrogen, i.e. 0.89 mmol of bound EDTA per g of polymer. Infrared spectra proved the presence of ester and carboxylate groups. The sorption of copper: 0.75 mmol Cu++/g.

What is claimed:

1. Polymeric polydentate complexons of general formulae I and II,

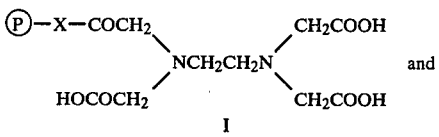

and

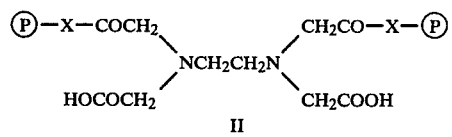

where  is the linear or three-dimensional polymeric skeleton and X is —O— or $$-\underset{R}{\overset{|}{N}}-,$$

where R is hydrogen, alkyl with 1–6 carbon atoms, phenyl or phenyl substituted with 1–2 alkyl or alkoxyl groups with 1–6 carbon atoms.

2. The preparation of the polymeric complexons of general formulae I and II, wherein the polymeric compound  -XH, where Ⓟ is a polymeric skeleton and X is —O— or $$-\underset{R}{\overset{|}{N}}-,$$

while R is H, alkyl with 1–6 carbon atoms, phenyl or phenyl substituted with 1–2 alkyl or alkoxyl groups with 1–6 carbon atoms, reacts with 4,4'-ethylenebis(2,6-morpholinedione) in the presence of an inert solvent.

* * * * *